(12) United States Patent
Fernandez-Orellana et al.

(10) Patent No.: US 11,470,445 B2
(45) Date of Patent: Oct. 11, 2022

(54) METHODS FOR ACCESS LATENCY REDUCTION THROUGH PHONE PRE-CONNECTION BASED ON USER LOCATION

(71) Applicant: Carrier Corporation, Palm Beach Gardens, FL (US)

(72) Inventors: Pedro Fernandez-Orellana, Shanghai (CN); Ankit Tiwari, South Windsor, CT (US); Kunal Srivastava, Manchester, CT (US); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/049,908

(22) PCT Filed: Apr. 22, 2019

(86) PCT No.: PCT/US2019/028436
§ 371 (c)(1),
(2) Date: Oct. 22, 2020

(87) PCT Pub. No.: WO2019/209671
PCT Pub. Date: Oct. 31, 2019

(65) Prior Publication Data
US 2021/0250730 A1    Aug. 12, 2021

(30) Foreign Application Priority Data
Apr. 25, 2018  (CN) .......................... 201810378416.5

(51) Int. Cl.
*H04W 4/02* (2018.01)
*G07C 9/00* (2020.01)
*H04W 52/02* (2009.01)

(52) U.S. Cl.
CPC ........ *H04W 4/023* (2013.01); *G07C 9/00904* (2013.01); *H04W 52/0209* (2013.01)

(58) Field of Classification Search
None
See application file for complete search history.

(56) References Cited

U.S. PATENT DOCUMENTS

| 8,494,576 | B1 | 7/2013 | Bye et al. |
| 2012/0137132 | A1 | 5/2012 | Le Saint |
| 2013/0027180 | A1 | 1/2013 | Lakamraju et al. |

(Continued)

FOREIGN PATENT DOCUMENTS

WO    2015191190 A1    12/2015

OTHER PUBLICATIONS

"How Kisi Works"; https://www.getkisi.com/how-it-works; Mar. 16, 2018; 1-5 pages.

(Continued)

*Primary Examiner* — Adolf Dsouza
(74) *Attorney, Agent, or Firm* — Cantor Colburn LLP

(57) ABSTRACT

A method including: projecting a first wireless signal at a first rate; detecting the first wireless signal indicating that a mobile device is located at a first distance away from a first access control; obtaining a credential from the mobile device; transmitting the credential to a group of access controls; and projecting a second wireless signal at a second rate for a selected time period.

13 Claims, 3 Drawing Sheets

(56) References Cited

U.S. PATENT DOCUMENTS

| | | |
|---|---|---|
| 2014/0049361 A1 | 2/2014 | Ahearn |
| 2015/0003320 A1 | 1/2015 | Anderson et al. |
| 2015/0199863 A1 | 7/2015 | Scoggins et al. |
| 2015/0200925 A1 | 7/2015 | Lagerstedt et al. |
| 2016/0066137 A1 | 3/2016 | Raghavendra et al. |
| 2016/0379428 A1 | 12/2016 | Ahearn et al. |
| 2017/0076523 A1 | 3/2017 | Reumbre et al. |
| 2017/0124773 A1 | 5/2017 | Busch-Sorensen et al. |
| 2017/0178432 A1 | 6/2017 | Newby et al. |
| 2017/0186252 A1 | 6/2017 | Raina et al. |
| 2017/0228953 A1 | 8/2017 | Lupovici |
| 2017/0265026 A1 | 9/2017 | Ahearn et al. |
| 2018/0144569 A1* | 5/2018 | Einberg ............... H04W 4/027 |
| 2018/0152444 A1* | 5/2018 | Caterino ............... H04B 1/385 |

OTHER PUBLICATIONS

Notification of Transmittal of the International Search Report for Application No. PCT/US2019/028436; Report dated Jul. 4, 2019; 5 pages.
Penny, Janelle; "Buildings—Smarter Facility Management"; https://www.buildings.com/article-details/articleid/21265/title/simplify-access-control-with-smartphones; Sep. 1, 2017; 1-8 pages.
Written Opinion of the International Searching Authority for Application No. PCT/US2019/028436; Report dated Jul. 4, 2019; 7 pages.

* cited by examiner

METHODS FOR ACCESS LATENCY REDUCTION THROUGH PHONE PRE-CONNECTION BASED ON USER LOCATION

CROSS-REFERENCE TO RELATED APPLICATIONS

This application is a National Stage Application of International Application No. PCT/US2019/028436 filed Apr. 22, 2019, which claims the benefit of Chinese Application No. 201810378416.5 filed Apr. 25, 2018, the disclosures of which are incorporated herein by reference in their entirety.

BACKGROUND

The subject matter disclosed herein generally relates to the field of access control systems, and more particularly to an apparatus and method for operating access control systems.

Existing access controls may allow an individual to unlock rooms via a mobile device however it is difficult to determine when the individual is located proximate to the room they wish to unlock, which may lead the access control continuously projecting a wireless signal for the mobile device to detect.

BRIEF SUMMARY

According to one embodiment, a method of conserving energy while seeking to wirelessly actuate an access control using a mobile device is provided. The method including: projecting a first wireless signal at a first rate; detecting the first wireless signal indicating that a mobile device is located at a first distance away from a first access control; obtaining a credential from the mobile device; transmitting the credential to a group of access controls; and projecting a second wireless signal at a second rate for a selected time period.

In addition to one or more of the features described above, or as an alternative, further embodiments may include that the second rate is greater than the first rate.

In addition to one or more of the features described above, or as an alternative, further embodiments may include that the first wireless signal and the second wireless signal are projected by the first access control and the group of access controls, and the first wireless signal is detected by the mobile device.

In addition to one or more of the features described above, or as an alternative, further embodiments may include that the first wireless signal and the second wireless signal are projected by the mobile device, and the first wireless signal is detected by the first access control and the group of access controls.

In addition to one or more of the features described above, or as an alternative, further embodiments may include that the first wireless signal is projected by a master beacon, the second wireless signal is projected by the first access control and the group of access controls, and the first wireless signal is detected by the mobile device.

In addition to one or more of the features described above, or as an alternative, further embodiments may include that the projecting a second wireless signal at a second rate greater than the first rate for a selected time period is performed by access controls of the group of access controls that the mobile device is authorized to actuate using the credential.

In addition to one or more of the features described above, or as an alternative, further embodiments may include: projecting a third wireless signal at a third rate less than the second rate for a second selected time period, wherein the projecting a third wireless signal at a third rate less than the second rate for a second selected time period is performed by access controls of the group of access controls that the mobile device is not authorized to actuate using the credential.

In addition to one or more of the features described above, or as an alternative, further embodiments may include that the third rate is less than or equal to the first frequency rate.

In addition to one or more of the features described above, or as an alternative, further embodiments may include: determining a final destination access control of the group of access controls, the projecting a second wireless signal at a second rate greater than the first rate for a selected time period is only performed by the final destination access control.

In addition to one or more of the features described above, or as an alternative, further embodiments may include that the credential is transmitted to the group access controls by propagation of wireless signals between each access control of the group of access controls.

In addition to one or more of the features described above, or as an alternative, further embodiments may include that the first access control obtains the credential from the mobile device, transmits the credential to a server, and the server transmits the credential to the group of access controls.

According to another embodiment, a computer program product tangibly embodied on a computer readable medium, the computer program product including instructions that, when executed by a processor, cause the processor to perform operations comprising: projecting a first wireless signal at a first rate; detecting the first wireless signal indicating that a mobile device is located at a first distance away from a first access control; obtaining a credential from the mobile device; transmitting the credential to a group of access controls; and projecting a second wireless signal at a second rate for a selected time period.

In addition to one or more of the features described above, or as an alternative, further embodiments may include the second rate is greater than the first rate.

In addition to one or more of the features described above, or as an alternative, further embodiments may include that the first wireless signal and the second wireless signal are projected by the first access control and the group of access controls, and the first wireless signal is detected by the mobile device.

In addition to one or more of the features described above, or as an alternative, further embodiments may include that the first wireless signal and the second wireless signal are projected by the mobile device, and the first wireless signal is detected by the first access control and the group of access controls.

In addition to one or more of the features described above, or as an alternative, further embodiments may include that the first wireless signal is projected by a master beacon, the second wireless signal is projected by the first access control and the group of access controls, and the first wireless signal is detected by the mobile device.

In addition to one or more of the features described above, or as an alternative, further embodiments may include that the projecting a second wireless signal at a second rate greater than the first rate for a selected time period is performed by access controls of the group of access controls that the mobile device is authorized to actuate using the credential.

In addition to one or more of the features described above, or as an alternative, further embodiments may include that the operations further comprise: projecting a third wireless signal at a third rate less than the second rate for a second selected time period, the projecting a third wireless signal at a third rate less than the second rate for a second selected time period is performed by access controls of the group of access controls that the mobile device is not authorized to actuate using the credential.

In addition to one or more of the features described above, or as an alternative, further embodiments may include that the third rate is less than or equal to the first frequency rate.

In addition to one or more of the features described above, or as an alternative, further embodiments may include that the operations further comprise: determining a final destination access control of the group of access controls, the projecting a second wireless signal at a second rate greater than the first rate for a selected time period is only performed by the final destination access control.

Technical effects of embodiments of the present disclosure include tracking a location, position, and movement of a mobile device relative to access controls in order to determine zones of interest for the mobile device and increase sensing rate when the mobile device is within the zone of interest.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
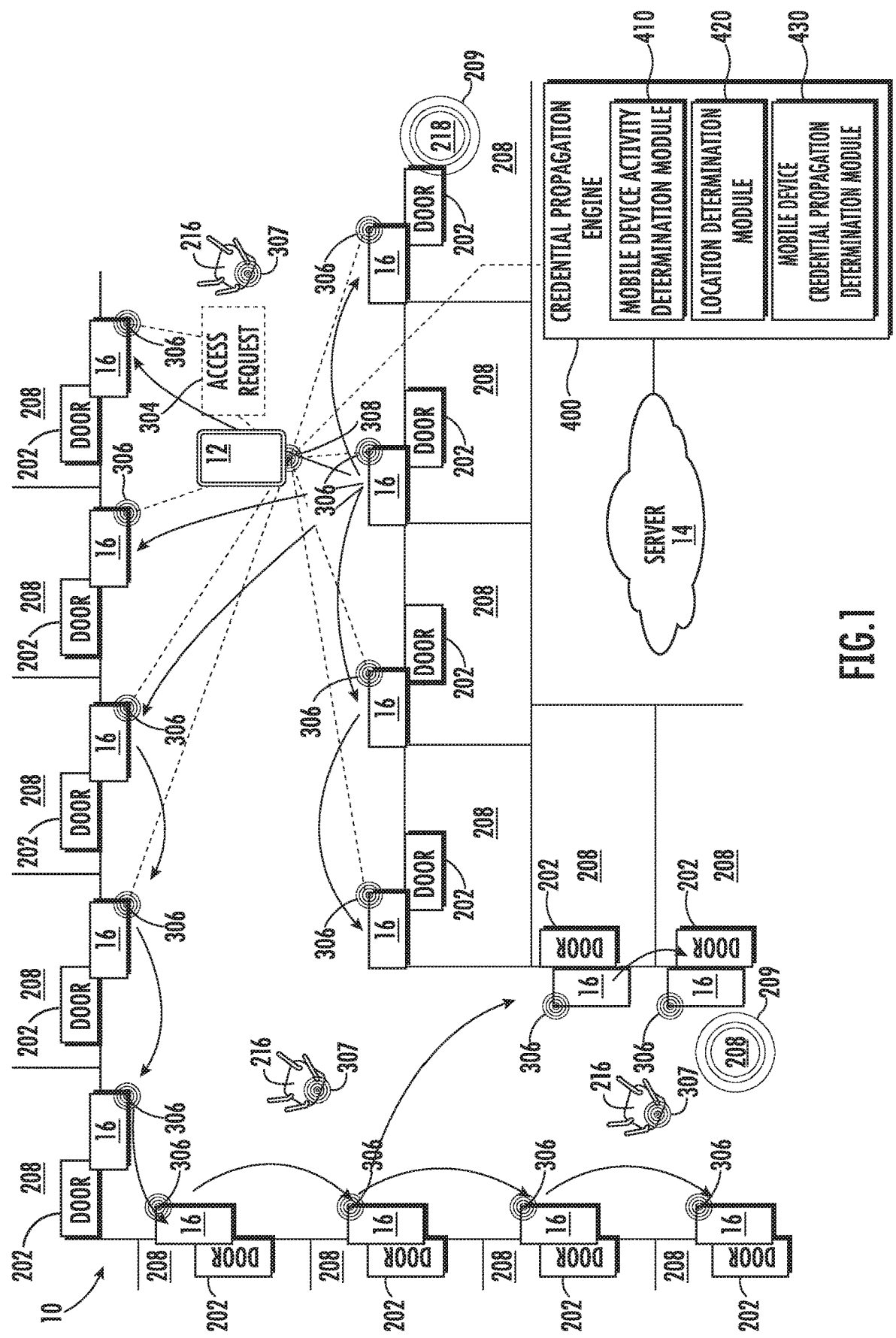
FIG. 1 illustrates a general schematic system diagram of an access control system, in accordance with an embodiment of the disclosure.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems such as, for example, elevators, turnstiles, safes, etc.

A mobile device 12 belonging to an individual may be granted access to one or more access controls 16 (e.g. the door lock on an office or hotel room assigned to the individual). In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices 12 per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16.

Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through the mobile device 12.

The system 10 may include a credential propagation engine 400 configured to propagate credentials for the mobile device 12 amongst a group of access controls 16. The credential propagation engine 400 is comprised of modules including a mobile device activity determination module 410; a location determination module 420; and a mobile device credential propagation determination module 430. Each module 410, 420, 430 may be located on either the mobile device 12 or the server 14. Alternatively, the modules 410, 420, 430 may be distributed between the mobile device 12 and the server 14.

The mobile device activity determination module 410 uses an inertial measurement unit (IMU) sensor 57 (see FIG. 2) on the mobile device 12 to detect a position of the mobile device 12 (e.g., how phone is carried by the an individual: in a hand of an individual, a back pocket of an individual, a front pocket of an individual) and an activity of an individual carrying the mobile device 12 (e.g., sitting, standing, moving, slowing, accelerating, and stopping). The IMU sensor 57 may be composed of one or more sensors including but not limited to an accelerometer and a light sensor. For example, the light sensor on the mobile device 12 may be used to determine if the mobile device 12 is in a pocket/bag or in hand and this information may be used to adjust for the signal strength. The mobile device activity determination module 410 also tracks interactions between the mobile device 12 and each access control 16. For example, each time the mobile device 12 transmits an access request to an access control 16, the access control 16 will be saved or book marked.

The mobile device location determination 420 is configured to detect positional data of the mobile device 12. The position data may include the location of the mobile device 12 at various granularity levels including but not limited to a geographical coordinate, a building where the mobile device 12 is located, a section of the building where the mobile device 12 is located, a floor in the building where the mobile device 12 is located, a hallway in the building where the mobile device 12 is located, a room where the mobile device 12 is located, and a distance between the mobile device 12 and each of the access controls 16. For example, from the distance between the mobile device 12 and each of the access controls 16, a location within the system 10 (i.e. a building) may be determined, since the location of each access controls 16 is already known. The mobile device location determination module 420 may also be configured to further refine the location of the mobile device 12 in response to the position of the mobile device 12 detected by the mobile device activity determination module 410 (e.g., a different location offset is applied if the mobile device 12 is in back pocket vs. front pocket of the individual carrying the mobile device 12). Knowing the position of the mobile device 12 is advantageous because the human body can cause interference in signal strength for wireless signals (e.g., Wi-Fi, Bluetooth, etc.), thus having the mobile device 12 in front or back pocket may cause the mobile device 12 to be in direct line of sight of the access control 16 or position an individual's body in between the mobile device 12 and the access control 16. Also advantageously, knowing the position of the mobile device 12 may help determine intent.

The mobile device credential propagation determination module 430 is configured to determine when and how to propagate a credential of a mobile device 12 in response to the position of the mobile device 12, the activity of an individual carrying the mobile device 12, interactions between the mobile device 12 and access controls 16, and the positional data of the mobile device 12. In an embodiment, the credential of the mobile device 12 is transmitted to all access devices 16 located within a selected range of the mobile device 12. The credential may be propagated between each of the access controls 16 utilizing the wireless signals 306 of the access controls 16, thus each access control 16 is capable communicating to other access controls 16. The propagation of the credential is displayed by arrows 310 in FIG. 1. Arrows 310 are utilized for exemplary purposes and propagation of the credential may occur differently. In an embodiment, the credential may be passed to the first access control 16 to connect with the mobile device 12 and then the credential may be transmitted to the server 14 and the server 14 may then distribute the credential to each access control 16.

In an embodiment, the credential may be propagated to each access control 16 within a selected range of a first access control 16 or a master beacon 218 that was first to connect with the mobile device 12. The selected range may vary in size depending on the access controls 16 that the mobile device 12 interacts with and/or may interact with. For example, the selected range may be a geographical coordinate, a distance away from a geographical coordinate, a building, a section of the building, a floor in the building, a hallway in the building, a room in the building, and a specific distance between the mobile device 12 and a specific access control 16. The system 10 may also contain master beacons 218 configured to advertise a wireless signal 309. The master beacon 218 may be transmitting to the mobile device 12 to trigger the mobile device to send the credential to an access control 16 or send the credential to the master beacon 218. In an embodiment, the master beacon 218 may be an access control 16 that is not battery powered. In embodiment, the wireless signal 309 emitting from the master beacon 218 may be advertised at a higher rate than the wireless signal 306 of the access controls 16. In another embodiment, the wireless signal 309 emitting from the master beacon 218 may be advertised across a further distance than the wireless signal 306 of the access controls 16. Advantageously, utilizing a dedicated maters beacon 218 may help conserve power of battery operated access controls 16, by allowing battery operated access controls 16 to advertise at a lower advertising rate so they consume less energy, while the master beacon 218 advertises at a much higher rate but is not battery powered.

Following completion of propagation of the credential, an access control 16 may begin to adjust the rate with which the access control 16 advertises its signal 306. In an embodiment, an access control 16 may only adjust the rate with which the access control 16 advertises its signal 306 if the credential is authorized to actuate the access control 16 (e.g., if the credential may unlock the door). In an embodiment, an access control 16 may only adjust the rate with which the access control 16 advertises its signal 306 if the access control 16 is determined to be a final destination access control 16 for the mobile device 12. For example, the access control 16 may be a determined final destination access control 16, if the mobile device 12 frequently uses the access control 16 based on past history learned during a commissioning period during which, an individual carrying a mobile device 12 may be tracked for a selected period of time. During the commissioning period a plurality of data points are tracking including but not limited to each position of the mobile device 12, activity of the mobile device 12, interaction of the mobile device 12, and positional data of the mobile device 12 may be tracked. After a commissioning or learning period, the specific preferences and tendencies of an individual carrying a mobile device 12 may be captured for each access control 16. Advantageously, by selectively adjusting the rate that each access control 306 advertises its wireless signal, the energy consumed by each access control 16 may be reduced.

The positional data of the mobile device 12 may be detected using one or more methods and apparatus. The positional data may be collected by the mobile device 12, and/or the server 14. The positional data may include a location of the mobile device 12 and/or a movement of mobile device 12 that is a derivative of a location of the mobile device 12, such as, for example, velocity, acceleration, jerk, jounce, snap . . . etc. The mobile device 12 may a determine positional data by the GPS 48, by the MEMS 57, wireless signal strength, and/or by triangulating wireless signals 307 from the wireless access protocol device(s) 216 or wireless signals 306 from the access control(s) 16. The location of the mobile device 12 may also be detected through triangulation of wireless signals emitted from the mobile device 12 or signal strength of wireless signals emitted from the mobile device 12. The location of the mobile device 12 may be detected using any other desired and known location detection/position reference means.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306. In an embodiment, once the credential of the mobile device 12 is propagated, the rate that each access control 16 advertises its wireless signal 306 may be adjusted. In another embodiment, once the credential of the mobile device 12 is propagated, the mobile device 12 may increase the rate of attempts to detect the wireless signal 306 of the access controls 16. Advantageously, by increasing either the rate that each access control 16 advertise its wireless signal 306 or the rate of attempts to detect the wireless signal 306 of the access controls 16 helps to increase the speed of interaction between the mobile device 12 and the access control 16, thus a connections between the access control 16 and the mobile device 12 will be made faster and access requests from the mobile device 12 to the access control 16 will be answered quicker.

Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a positional data of the mobile device 12 in response to a signal strength of the wireless signal 307.

Positional data of the mobile device 12 may also be determined using the wireless access protocol device 216 and/or the access controls 16 to detect a wireless signal 308 advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a positional data of the mobile device 12 in response to a signal strength of the wireless signal 308. The location of the mobile device 16 may be triangulated by relaying up to the location determination module 420 the strength of each wireless signal 308 detected and then the location determination module 420 can triangulate the position.

Wireless signal interaction data between the mobile device 12 and at least one of the access device 16 and the wireless access protocol device 216 may transmitted to the server 14 to determine positional data. In an embodiment, the location determination module 420 may be located on the server 14 and may be used to determine positional data. The server 14 may use signal strength detected between the mobile device 12, access controls 16, and the wireless access protocol device 216 to determine positional data of the mobile device 12.

Figure 2:
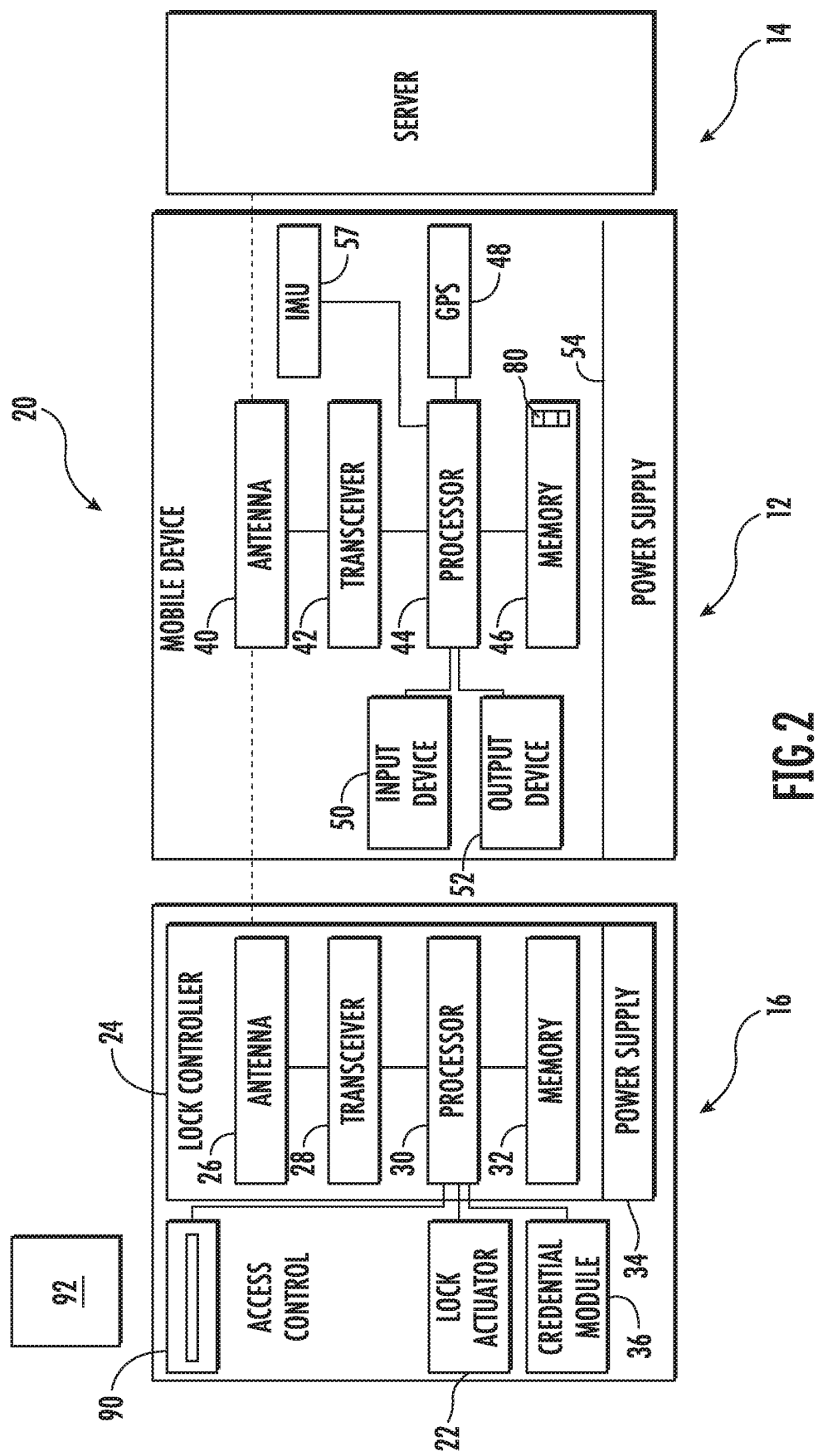
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components—a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and a MEMS 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The MEMS sensor 57 may be a sensor such as, for example, an accelerometer, a gyroscope, or a similar sensor known to one of skill in the art.

Figure 3:
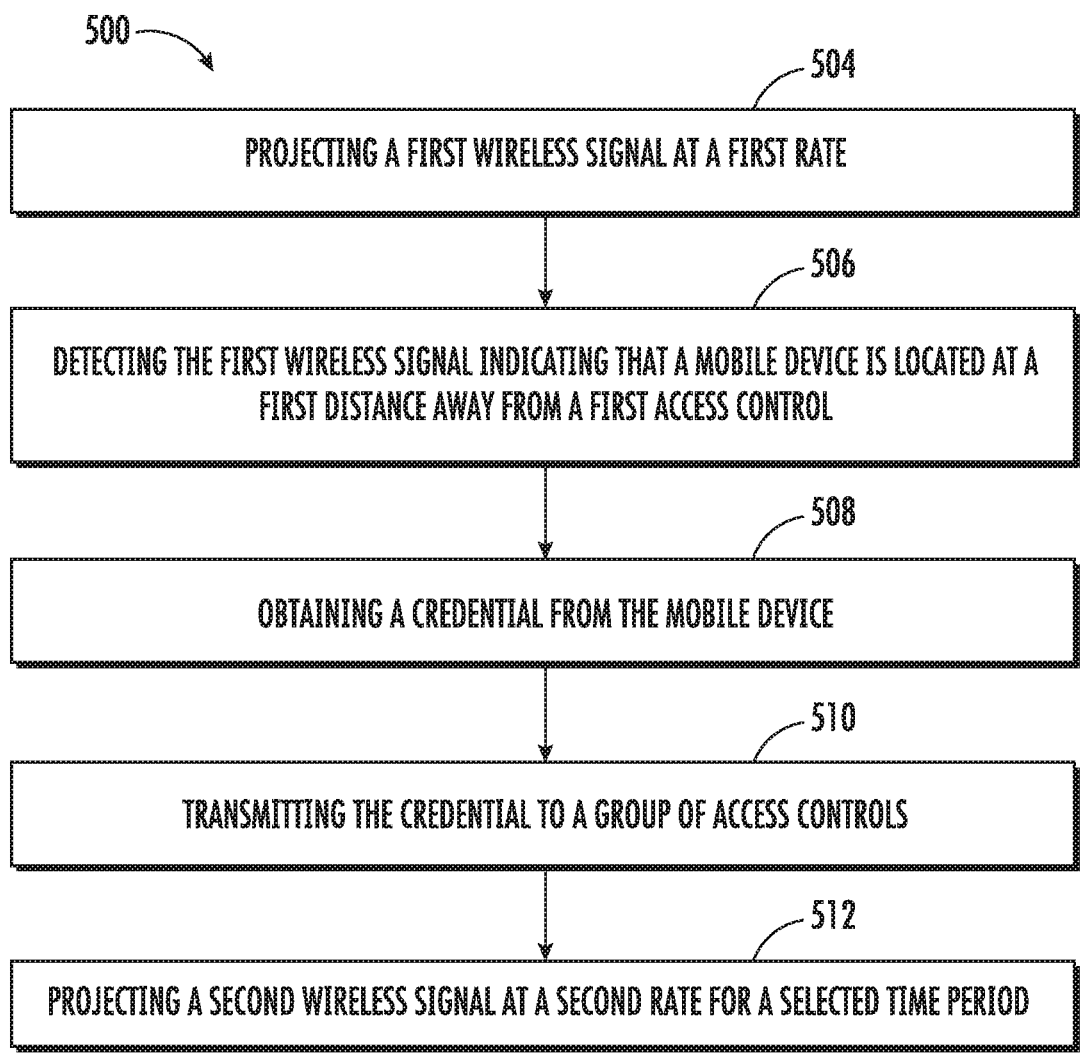
FIG. 3 is a flow diagram illustrating a method of conserving energy while seeking to wirelessly actuate an access control using a mobile device, according to an embodiment of the present disclosure.

Referring now to FIG. 3 with continued reference to FIGS. 1-2. FIG. 3 shows a flow chart of a method 500 of conserving energy while seeking to wirelessly actuate an access control 16 using a mobile device 12. The method 500 may be performed by the mobile device 12, access controls 16, and/or the server 14. At block 504, an apparatus projects a first wireless signal at a first rate. As mentioned above, in an embodiment, the apparatus may be the access control 16 projecting the wireless signal 306. In another embodiment, the apparatus may be the mobile device 12 projecting the wireless signal 308. In yet another embodiment, the apparatus may be a master beacon 218 projecting the wireless signal 309. At block 506, the first wireless signal is detected, which indicates that a mobile device 12 is located at a first distance away from a first access control 16. In an embodiment, the mobile device 12 may be detecting at least one of the wireless signal 306 projected by the access control 16 and the wireless signal 309 projected by the master beacon 218. In another embodiment, the wireless signal 308 projected by the mobile device 12 is detected by at least one of the access control 16 and the master beacon 218.

At block 508, a credential is obtained from the mobile device 12 by the apparatus projecting the first wireless signal. At block 510, the credential is transmitted/propagated to a group of access controls 16. The group of access controls 16 may be defined by access controls 16 located within a selected range of the first access control 16. As mentioned above, the selected range may vary in size depending on the access controls 16 that the mobile device 12 interacts with and/or may interact with. For example, the selected range may be a geographical coordinate, a distance away from a geographical coordinate, a building, a section of the building, a floor in the building, a hallway in the building, a room in the building, and a specific distance between the mobile device 12 and a specific access control 16. The credential may be transmitted to the group access controls 16 by propagation of wireless signals 306 between each access control 16 of the group of access controls 16. For example, the credential may be transmitted from one access control 16 to a neighboring access control 16 and so on and so forth until all of the access controls 16 contained within the group of access controls 16 received the credential of the mobile device 12, as seen in FIG. 2. Alternatively, the credential may be transmitted to at least one of the server 14, the wireless access protocol device 216, and the master beacon 218, then transmitted to each access control 16 of the group of access controls. For example, the first access control 16 obtains the credential from the mobile device 12, transmits the credential to a server 14, and the server 14 transmits the credential to the group of access controls 16. Advantageously, the pre-connect enables the access controls 16 to receive the credentials faster, which allows for latency reduction and seamless access once the individual carrying the mobile device 12 is at a final destination access control 16.

At block 512, a second wireless signal is projected at a second rate for a selected time period. In an embodiment, the second rate is greater than the first rate if both the first wireless signal and the second wireless signal are being advertised by an access control 16. Block 508 may be performed by all of the access controls 16 within the group of access controls 16, only access controls 16 of the group of access controls 16 that the mobile device 12 is authorized to actuate using the credential, or an access control 16 of the group of access controls 16 that has been determined to be final destination access control 16 (i.e., where the user carrying the mobile device 12 is most likely heading). Advantageously, by increasing the rate of the wireless signal projections, the speed of interaction between the mobile device 12 and access controls 16 that the mobile device 12 is most likely to interact with is increased. Also advantageously, for the intervening periods when no credential is being propagated, the rate can be much lower, which saves on battery life.

A third wireless signal at a third rate less than the second rate is projected for a second selected time period. The third wireless signal may be projected by access controls 16 of the group of access controls 16 that the mobile device 12 is not authorized to actuate using the credential, or an access control 16 of the group of access controls 16 that has been determined to not be final destination access control 16. In an embodiment, the third rate may be less than or equal to the first rate. Advantageously, by decreasing the rate of the wireless signal projections, the power consumption of access controls 16 that the mobile device 12 is least likely to interact with is reduced. Further, it is understood that the first rate, the second rate, and the third rate may be vary depending on whether the device sending the wireless advertisement is an access control 16, a wireless access protocol device 216, a master beacon 218, or mobile device 12.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of conserving energy while seeking to wirelessly actuate an access control using a mobile device, the method comprising:
   projecting a first wireless signal at a first rate;
   detecting the first wireless signal indicating that a mobile device is located at a first distance away from a first access control;
   obtaining a credential from the mobile device;
   transmitting the credential to a group of access controls, wherein the credential is transmitted to the group access controls by propagation of wireless signals between each access control of the group of access controls; and
   projecting a second wireless signal at a second rate for a selected time period;
   wherein the first wireless signal and the second wireless signal are projected by the first access control and the group of access controls, and the first wireless signal is detected by the mobile device;
   projecting a third wireless signal at a third rate less than the second rate for a second selected time period,
   wherein the projecting the third wireless signal at a third rate less than the second rate for a second selected time period is performed by access controls of the group of access controls that the mobile device is not authorized to actuate using the credential.

2. The method of claim 1, wherein the second rate is greater than the first rate.

3. The method of claim 1, wherein the first wireless signal and the second wireless signal are projected by the mobile device, and the first wireless signal is detected by the first access control and the group of access controls.

4. The method of claim 1, wherein the projecting a second wireless signal at a second rate greater than the first rate for a selected time period is performed by access controls of the group of access controls that the mobile device is authorized to actuate using the credential.

5. The method of claim 1, wherein the third rate is less than or equal to the first rate.

6. The method of claim 1, further comprising:
   determining a final destination access control of the group of access controls,
   wherein the projecting a second wireless signal at a second rate greater than the first rate for a selected time period is only performed by the final destination access control.

7. The method of claim 1, wherein the first access control obtains the credential from the mobile device, transmits the credential to a server, and the server transmits the credential to the group of access controls.

8. A computer program product tangibly embodied on a non-transitory computer readable medium, the computer program product including instructions that, when executed by a processor, cause the processor to perform operations comprising:
   projecting a first wireless signal at a first rate;

detecting the first wireless signal indicating that a mobile device is located at a first distance away from a first access control;

obtaining a credential from the mobile device;

transmitting the credential to a group of access controls, wherein the credential is transmitted to the group access controls by propagation of wireless signals between each access control of the group of access controls; and projecting a second wireless signal at a second rate for a selected time period;

wherein the first wireless signal and the second wireless signal are projected by the first access control and the group of access controls, and the first wireless signal is detected by the mobile device;

wherein the operations further comprise:

projecting a third wireless signal at a third rate less than the second rate for a second selected time period, wherein the projecting the third wireless signal at a third rate less than the second rate for a second selected time period is performed by access controls of the group of access controls that the mobile device is not authorized to actuate using the credential.

9. The computer program product of claim 8, wherein the second rate is greater than the first rate.

10. The computer program product of claim 8, wherein the first wireless signal and the second wireless signal are projected by the mobile device, and the first wireless signal is detected by the first access control and the group of access controls.

11. The computer program product of claim 8, wherein the projecting a second wireless signal at a second rate greater than the first rate for a selected time period is performed by access controls of the group of access controls that the mobile device is authorized to actuate using the credential.

12. The computer program product of claim 8, wherein the third rate is less than or equal to the first rate.

13. The computer program product of claim 8, wherein the operations further comprise:

determining a final destination access control of the group of access controls, wherein the projecting a second wireless signal at a second rate greater than the first rate for a selected time period is only performed by the final destination access control.

\* \* \* \* \*